(12) United States Patent
Peterson et al.

(10) Patent No.: US 12,527,339 B2
(45) Date of Patent: Jan. 20, 2026

(54) APIGENIN GLYCOSIDES FLAVOR ENHANCERS

(71) Applicant: Ohio State Innovation Foundation, Columbus, OH (US)

(72) Inventors: Devin Peterson, Upper Arlington, OH (US); Eric Schwartz, Rockville, MD (US); Wen Cong, Dublin, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 926 days.

(21) Appl. No.: 17/771,445

(22) PCT Filed: Oct. 23, 2020

(86) PCT No.: PCT/US2020/057197
§ 371 (c)(1),
(2) Date: Apr. 22, 2022

(87) PCT Pub. No.: WO2021/081429
PCT Pub. Date: Apr. 29, 2021

(65) Prior Publication Data
US 2023/0000121 A1    Jan. 5, 2023

Related U.S. Application Data

(60) Provisional application No. 62/924,896, filed on Oct. 23, 2019.

(51) Int. Cl.
*A23L 27/20* (2016.01)
*A23L 7/10* (2016.01)
*A23L 27/00* (2016.01)

(52) U.S. Cl.
CPC ............... *A23L 27/204* (2016.08); *A23L 7/10* (2016.08); *A23L 27/86* (2016.08); *A23V 2002/00* (2013.01)

(58) Field of Classification Search
CPC ...................................................... A23L 27/204
See application file for complete search history.

(56) References Cited

U.S. PATENT DOCUMENTS

| | | | |
|---|---|---|---|
| 3,540,889 | A | 11/1970 | Clinton et al. |
| 3,924,017 | A | 12/1975 | Lee et al. |
| 5,087,469 | A | 2/1992 | Acree |
| 5,232,735 | A | 8/1993 | Kurtz et al. |
| 5,336,513 | A | 8/1994 | Riemer |
| 8,197,875 | B2 | 6/2012 | Chien et al. |

(Continued)

FOREIGN PATENT DOCUMENTS

| | | |
|---|---|---|
| JP | 2013096895 | 5/2013 |
| JP | 2014204740 | 10/2014 |

(Continued)

OTHER PUBLICATIONS

Derwent abstract for JP 2018-43970, publication date Mar. 22, 2018, pp. 1-4. (Year: 2018).*

(Continued)

*Primary Examiner* — Jenna A Watts
(74) *Attorney, Agent, or Firm* — Meunier Carlin & Curfman LLC

(57) ABSTRACT

Disclosed herein are compounds and methods useful for improving the flavor and suppressing bitter sensations is a variety of food products, including cereals and grains such as wheat.

11 Claims, 1 Drawing Sheet

(56) References Cited

U.S. PATENT DOCUMENTS

| | | | |
|---|---|---|---|
| 2004/0213881 | A1 | 10/2004 | Chien et al. |
| 2006/0286238 | A1 | 12/2006 | Zehentbauer et al. |
| 2007/0042097 | A1 | 2/2007 | Norton et al. |
| 2007/0269570 | A1 | 11/2007 | Degenhardt et al. |
| 2014/0272068 | A1 | 9/2014 | Prakash et al. |
| 2016/0007625 | A1 | 1/2016 | Domon |
| 2016/0242431 | A1 | 8/2016 | Nakahara et al. |
| 2016/0366915 | A1 | 12/2016 | Singh et al. |
| 2017/0327776 | A1 | 11/2017 | Chien |
| 2018/0132516 | A1* | 5/2018 | Ray ..................... A23L 29/35 |
| 2021/0267243 | A1 | 9/2021 | Peterson et al. |
| 2022/0218008 | A1 | 7/2022 | Peterson |
| 2022/0395007 | A1 | 12/2022 | Peterson et al. |

FOREIGN PATENT DOCUMENTS

| | | | |
|---|---|---|---|
| JP | 201843970 A | * 3/2018 | .......... A61K 36/185 |
| WO | 02087360 | 11/2002 | |
| WO | 2015158895 A1 | 10/2015 | |
| WO | 2019180140 A2 | 9/2019 | |
| WO | 2020061223 | 3/2020 | |
| WO | 2020210118 | 10/2020 | |
| WO | 2021081417 | 4/2021 | |

OTHER PUBLICATIONS

Albertson, A. et al., Whole grain consumption trends and associations with body weight measures in the United States: results from the cross sectional National Health and Nutrition Examination Survey 2001-2012, Nutr. J. 15, 8, 2016.

Andujar-Ortiz, I., Peppard, T. L., & Reineccius, G. (2015). Flavoromics for determining markers of cooked and fermented flavor in strawberry juices. In ACS Symposium Series (vol. 1191, pp. 293-312).

Baggenstos, J, et al., (2008) Coffee roasting and aroma formation: application of different time—temperature conditions. J Agric Food Chem 56:5836-5846.

Bertrand, B., et al., (2012). Climatic factors directly impact the volatile organic compound fingerprint in green Arabica coffee bean as well as coffee beverage quality. Food Chemistry, 135(4), 2575-2583.

Blank, I., et al., (1991). Aroma impact compounds of arabica and robusta coffee. Qualitative and quantitative investigations. ASIC. 14e Colloque, 117-129.

Blank, I., et al., (1992). Potent odorants of the roasted powder and brew of Arabica coffee. Zeitschrift Für Lebensmittel-Untersuchung Und Forschung, 195(3), 239-245.

Blumberg et al: "Quantitative Studies on the Influence of the Bean Roasting Parameters and Hot Water Percolation on the Concentrations of Bitter Compounds in Coffee Brew", Journal of Agricultural and Food Chemistry, vol. 58, No. 6, Feb. 24, 2010 (Feb. 24, 2010), pp. 3720-3728, XP055064049, ISSN: 0021-8561, DOI: 10.1021/jf9044606.

Bucheli, P., et al., (1998). Industrial storage of green Robusta coffee under tropical conditions and its impact on raw material quality and ochratoxin A content. Journal of Agricultural and Food Chemistry, 46(11), 4507-4511.

Buffo, R. A., & Cardelli-Freire, C. (2004). Coffee flavour: an overview. Flavour and Fragrance Journal, 19(2), 99-104.

Charles, M., et al., (2015). Understanding flavour perception of espresso coffee by the combination of a dynamic sensory method and in-vivo nosespace analysis. Food Research International, 69, 9-20.

Charles-Bernard, M. et al., Interactions between volatile and nonvolatile coffee components. 1. Screening of nonvolatile components, 2005; 53(11):4417-25.

Charve, J., et al., (2011). Evaluation of instrumental methods for the untargeted analysis of chemical stimuli of orange juice flavour. Flavour and Fragrance Journal, 26(6), 429-440.

Chung, H. Y., et al., (2005). Aroma impact components in commercial plain sufu. Journal of Agricultural and Food Chemistry, 53(5), 1684-1691.

Clifford, M. N. (1985). Chemical and Physical Aspects of Green Coffee and Coffee Products. In Coffee (pp. 305-374). Boston, MA: Springer US.

Clifford, M. N., et al., (2003). Hierarchical scheme for LC-MS identification of chlorogenic acids. Journal of Agricultural and Food Chemistry, 51(10), 2900-2911.

Craig, A. P., et al., (2018). Mid infrared spectroscopy and chemometrics as tools for the classification of roasted coffees by cup quality. Food Chemistry, 245, 1052-1061.

Dalton, P., et al., (2000). The merging of the senses: integration of subthreshold taste and smell. Nature Neuroscience, 3(5), 431-432.

Dias, R.C.E., et al., (2014) Roasting process affects the profile of diterpenes in coffee. Eur Food Res Technol 239:961-970.

Dias, R.C.E., et al., (2013) Comparison of Extraction Methods for Kahweol and Cafestol Analysis in Roasted Coffee. Artic J Braz Chem Soc 24:492-499.

Dorfner, R., et al., (2003). Real-time monitoring of 4-vinylguaiacol, guaiacol, and phenol during coffee roasting by resonant laser ionization time-of-flight mass spectrometry. Journal of Agricultural and Food Chemistry, 51(19), 5768-5773.

Farah, A., et al., (2005). Effect of roasting on the formation of chlorogenic acid lactones in coffee. Journal of Agricultural and Food Chemistry, 53(5), 1505-1513.

Farah, Adriana, et al. "Correlation between cup quality and chemical attributes of Brazilian coffee." Food chemistry 98.2 (2006): 373-380.

Feng, Y., et al., (2013). Effect of koji fermentation on generation of volatile compounds in soy sauce production. International Journal of Food Science and Technology, 48(3), 609-619.

Feria-Morales, A. M. (2002). Examining the case of green coffee to illustrate the limitations of grading systems/expert tasters in sensory evaluation for quality control. Food Quality and Preference, 13(6), 355-367.

Frank, O., et al., (2006). Bioresponse-guided decomposition of roast coffee beverage and identification of key bitter taste compounds. Eur Food Res Technol, 222, 492-508.

Frank, O., et al., (2007). Structure determination and sensory analysis of bitter-tasting 4-vinylcatechol oligomers and their identification in roasted coffee by means of LC-MS/MS. Journal of agricultural and food chemistry, 55(5), 1945-1954.

Fujimura Y, et al., (2011) Metabolomics-Driven Nutraceutical Evaluation of Diverse Green Tea Cultivars. PLoS One 6:e23426.

Geel, L., et al., (2005). Relating consumer preferences to sensory attributes of instant coffee. Food Quality and Preference, 16(3), 237-244.

Giacalone, D., et al., (2016). "Quality does not sell itself." British Food Journal, 118(10), 2462-2474.

Ginz, M., & Engelhardt, U. H. (2000). Identification of proline-based diketopiperazines in roasted coffee. Journal of agricultural and food chemistry, 48(8), 3528-3532.

Harwood, M. L., et al., (2012). Rejection thresholds in chocolate milk: Evidence for segmentation. Food Quality and Preference, 26(1), 128-133.

Holscher, W., et al., (1990). Identification and sensorial evaluation of aroma- impact-compounds in roasted colombian coffee. Caf, Cacao Th,, 34(3), 205-212.

Iwasa, K., et al., (2015). Identification of 3-Methylbutanoyl Glycosides in Green Coffea arabica Beans as Causative Determinants for the Quality of Coffee Flavors. Journal of Agricultural and Food Chemistry, 63(14), 3742-3751.

Kreppenhofer, S., et al., (2011). Identification of (furan-2-yl) methylated benzene diols and triols as a novel class of bitter compounds in roasted coffee. Food chemistry, 126(2), 441-449.

Kumazawa, K., & Masuda, H. (2003). Investigation of the change in the flavor of a coffee drink during heat processing. Journal of Agricultural and Food Chemistry, 51(9), 2674-2678.

Kwon, D.-J., et al., (2015). Assessment of green coffee bean metabolites dependent on coffee quality using a 1H NMR-based metabolomics approach. Food Research International, 67, 175-182.

(56) References Cited

OTHER PUBLICATIONS

Lang, R., et al., (2013). 2-O-β-d-Glucopyranosyl-carboxyatractyligenin from *Coffea* L. inhibits adenine nucleotide translocase in isolated mitochondria but is quantitatively degraded during coffee roasting. Phytochemistry, 93, 124-135.
Lang, R., et al., (2015). Mozambioside is an arabica-specific bitter-tasting furokaurane glucoside in coffee beans. Journal of agricultural and food chemistry, 63(48), 10492-10499.
Ley, J. P. (2008). Masking bitter taste by Molecules. Chemosensory Perception, 1(1), 58-77.
Ley, J. P., et al., (2006). New bitter-masking compounds: Hydroxylated benzoic acid amides of aromatic amines as structural analogues of homoeriodictyol. Journal of Agricultural and Food Chemistry, 54(22), 8574-8579.
Masi, C., et al., (2015). The impact of individual variations in taste sensitivity on coffee perceptions and preferences. Physiology & behavior, 138, 219-226.
Maehashi, K. and Huang, L., Bitter peptides and bitter taste receptors, Cell. Mol. Life Sci. 66, 1661, 2009.
Novaes FJM, et al., (2015) New approaches on the analyses of thermolabile coffee diterpenes by gas chromatography and its relationship with cup quality. Talanta 139:159-166.
Pereira, L. L., et al., (2017). The consistency in the sensory analysis of coffees using Q-graders. European Food Research and Technology, 243(9), 1545-1554.
Piccino, S., et al., (2014). Aromatic composition and potent odorants of the "specialty coffee" brew "Bourbon Pointu" correlated to its three trade classifications. Food Research International, 61, 264-271.
Ribeiro, J. S., et al., (2011). Chemometric models for the quantitative descriptive sensory analysis of Arabica coffee beverages using near infrared spectroscopy. Talanta, 83(5).
Ronningen, I., et al., (2018). Identification and Validation of Sensory-Active Compounds from Data-Driven Research: A Flavoromics Approach. Journal of Agricultural and Food Chemistry, 66(10), 2473-2479.
Ronningen, I., & Peterson, D. G. (2018). Identification of Aging-Associated Food Quality Changes in Citrus Products Using Untargeted Chemical Profiling. Journal of Agricultural and Food Chemistry, 66(3), 682-688.
Samoggia, A., & Riedel, B. (Oct. 1, 2018). Coffee consumption and purchasing behavior review: Insights for further research. Appetite. Academic Press.
SCA. (2018). Protocols & Best Practices-Specialty Coffee Association. Retrieved from https://sca.coffee/research/protocols-best-practices/.
Scheidig C, et al., (2007) Changes in Key Odorants of Raw Coffee Beans during Storage under Defined Conditions. J Agric Food Chem 55: 5768-5775.
Schieberle, P., & Grosch, W. (1988). Quantitative analysis of important volatile flavour compounds in fresh and stored lemon oil/citric acid emulsions. Lebensm.-Wiss.u.-Technol., 21, 158-162.
Schrader, K., et al., (1996). Determination of chlorogenic acids with lactones in roasted coffee. J Sci Food Agric, 71(3), 392-398.
Sittipod, S., et al., (2019). Identification of flavor modulating compounds that positively impact coffee quality. Food chemistry, 301, 125250.
Sittipod, S., et al., (2020). Identification of Compounds that Negatively Impact Coffee Quality Using Untargeted LC/MS Analysis. Journal of Agricultural and Food Chemistry.
Slavin, J., Dietary Guidelines, Are We on the Right Path?, Nutr. Today 47, 245 (2012).
Speer, K. and Kölling-Speer, I. (2006) The lipid fraction of the coffee bean. Brazilian J Plant Physiol 18:201-216.
Specialty Coffee Association. Accessed Apr. 7, 2019. From: https://sca.coffee/research/coffee-standards.
Sunarharum, W. B., et al., (2014). Complexity of coffee flavor: A compositional and sensory perspective. Food Research International, 62, 315-325.
Teegarden, M. D., et al., (2019). Profiling the impact of thermal processing on black raspberry phytochemicals using untargeted metabolomics. Food Chemistry, 274, 782-788.
Tepper, B., et al., (2009). Genetic variation in taste sensitivity to 6-n-propylthiouracil and its relationship to taste perception and food selection. Annals of the New York Academy of Sciences, 1170(1), 126-139.
Toci, A. T., & Farah, A. (2008). Volatile compounds as potential defective coffee beans' markers. Food Chemistry, 108(3), 1133-1141.
Tolessa, K., et al., (2016). Prediction of specialty coffee cup quality based on near infrared spectra of green coffee beans. Talanta, 150, 367-374.
Upadhyay, R., & Mohan Rao, L. J. (2013). An Outlook on Chlorogenic Acids-Occurrence, Chemistry, Technology, and Biological Activities. Critical Reviews in Food Science and Nutrition, 53(9), 968-984.
Extended European Search Report issued for Application No. 19863400.8, dated May 2, 2022. 8 pages.
Non-Final Office Action for U.S. Appl. No. 17/277,465 dated Mar. 15, 2023, 8 pages.
International Search Report and Written Opinion for International Application No. PCT/US2020/057180 dated Jan. 27, 2021, 8 pages.
International Search Report and Written Opinion for International Application No. PCT/US2019/051780 dated Dec. 4, 2019, 8 pages.
International Search Report and Written Opinion for International Application No. PCT/US2020/034016 dated Sep. 25, 2020, 10 pages.
Extended European Search Report issued on Oct. 16, 2023, in European Patent Application No. 20878972.7.
Bin et al., "Identification of bitter compounds in whole wheat bread crumb," Food Chemistry, Elsevier Ltd, NL, vol. 203, Jan. 28, 2016, pp. 8-15.
Cong et al., "Identification of inhibitors of pinellic acid generation in whole wheat bread," Food Chemistry, Elsevier Ltd, NL, vol. 351, Feb. 15, 2021.
Extended European Search Report issued on Oct. 6, 2023, in European Patent Application No. 20878059.3.
Kucera et al., "Study of composition of espresso coffee prepared from various roast degrees of *Coffea arabica* L. coffee beans," Food Chemistry, Elsevier Ltd, NL, vol. 199, Dec. 18, 2015, pp. 727-735.
Lang et al., "Raw coffee based dietary supplements contain carboxyatractyligenin derivatives inhibiting mitochondrial adenine-nucleotide-translocase," Food and Chemical Toxicology, Pergamon, GB, vol. 70, May 24, 2014, pp. 198-204.
Xuan et al., "Atractyligenin, a terpenoid isolated from coffee silverskin, inhibits cutaneous photoaging," Journal of Photochemistry and Photobiology B: Biology, vol. 194, Apr. 4, 2019, pp. 166-173.
Restriction Requirement mailed on Apr. 22, 2024, in U.S. Appl. No. 17/612,779.
Communication Pursuant to Article 94(3) EPC mailed on May 24, 2024, in European Patent Application No. 20878059.3.
International Searching Authority (ISA/US). International Search Report and Written Opinion, issued in PCT Application No. PCT/US2020/057197 on Mar. 8, 2021. 8 pages.
Pubchem CID 183905. 6,8-Di-C-beta-D-arabinopyranosyl apigenin. Created Sep. 8, 2005. 10 pages.
Pubchem CID 5280441. Vitexin. Created Sep. 16, 2004. 34 pages.
Pubchem CID 162350. Isovitexin. Created Sep. 16, 2004. 28 pages.
Glowacki et al. Determination of Total Aplgenin in Herbs by Micellar Electrokinetic Chromatography with UV Detection. Journal of Analytical Methods in Chemistry. vol. 2016. Article ID 3827832. (2016). 8 pages.
Non-Final Office Action issued on Jul. 16, 2024, in U.S. Appl. No. 17/612,779.
Bjarnadottir, A., Is Coffee Acidic?, 2019, Healthline, https://www.healthonline.com/nutrition/is-coffee-acidic (Year: 2019).
Dawidowicz et al., "The influence of pH on the thermal stability of 5-O—caffeoylquinic acids in aqueous solutions", 2011, Eur Food Res Technol, 233, pp. 223-232 (Year: 2011).

(56) References Cited

OTHER PUBLICATIONS

Extended European Search Report, dated Jan. 5, 2023, received in connection with corresponding EP Patent Application No. 20810128.7.

* cited by examiner

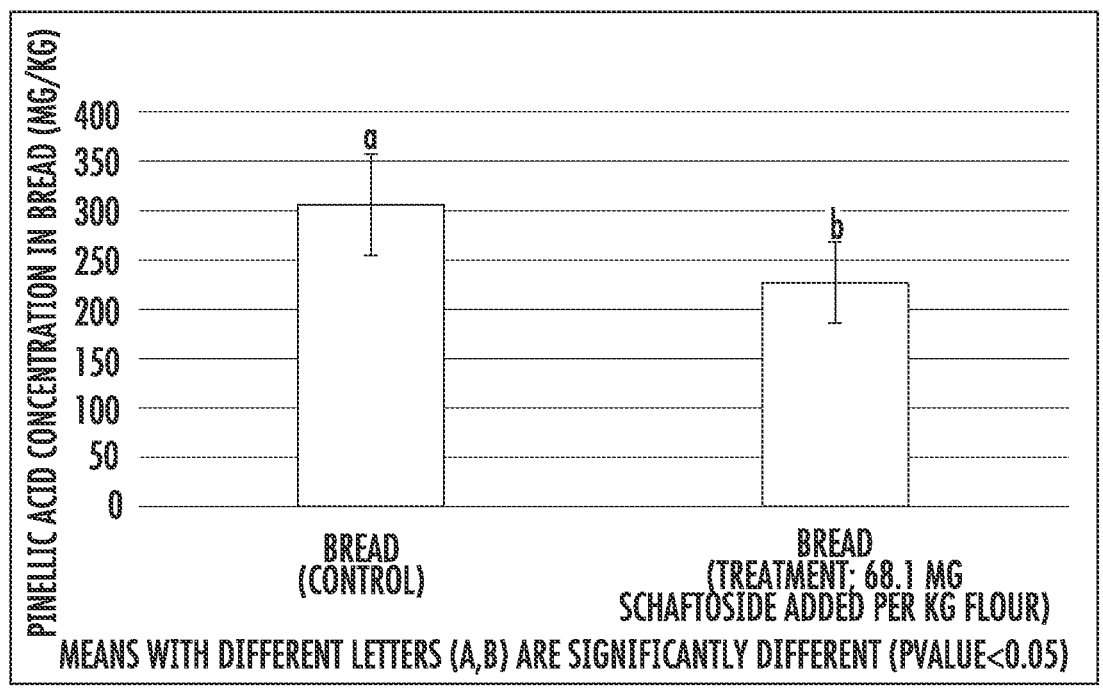

APIGENIN GLYCOSIDES FLAVOR ENHANCERS

CROSS REFERENCE TO RELATED APPLICATION

This application is a national stage application filed under 35 U.S.C. § 371 of PCT/US2020/057197 filed Oct. 23, 2020, which claims the benefit of U.S. Provisional Application 62/924,896, filed on Oct. 23, 2019, the contents of which are hereby incorporated in its entirety.

FIELD OF THE INVENTION

The invention is directed to compounds for improving the flavor of food product, especially grains and cereals.

BACKGROUND

Around the world, rice, wheat, maize, sorghum and millets are important staples critical to daily survival of billions of people. The USDA's Economic Research Service's Wheat Outlook report has published that global wheat production in 2019-20 is projected to reach a new record of 780.8 million tonnes (Lyddon, States, America, Commodities, & Report, 2019). Based on the wheat export price provided by USDA and World Bank, wheat prices were approximately 227 dollars per ton (Haile, Kalkuhl, & Von Braun, 2016) leading to a large global wheat market of $177.24 billion. According to Statistics Market Research Consulting, the Global Whole Grain and High Fiber Foods market is expected to grow from $29.4 billion in 2015 to $46.2 billion by 2022 at a Compound Annual Growth Rate (CAGR) of 6.6%. The demand of whole grain and high fiber foods in Asia Pacific region is expected to grow at the highest rate of more than 5.5%. The main factors driving the marker growth including improved tastes and flavors, increasing awareness of consumer towards healthy foods as well as aged nutrition, childhood obesity and diabetes in the United States, etc.

The health benefits of whole grain intake have been linked to a reduction in chronic pathological conditions including heart disease, cancer, diabetes, and a reduced risk of weight gain leading to the USDA recommendation for at least half of all grain intake be from whole grain sources (*Nutr. Today* 47, 245 (2012)). Currently across all age-sex groups, whole grain intake on average is far below the recommended levels. Consumers, however, are becoming increasingly aware of the contribution of whole grains to a healthy diet. This awareness, driven by dietary guidance, is evidenced by national surveys indicating two-thirds of consumers consider whole grains an important factor when making purchasing decisions (*Nutr. J.* 15, 8 (2016)). The limiting factor in increasing whole grain consumption has largely been related to production challenges hindering the development of high flavor quality products. Whole wheat products are generally associated with several negative flavor attributes such as graininess, negative wheat-like taste, oxidized aroma notes, and an overall flavor-muting phenomenon and in particular bitterness, which is also an innate taste aversion in humans (Cell. Mol. Life Sci. 66, 1661 (2009)).

There remains a need to improve the flavor of grain-based foods, including whole grain foods. There remains a need to reduce bitter flavors associated with grain-based foods.

SUMMARY

Disclosed herein are methods of improving the flavor of food products by incorporating an flavor-modulating compound. In some instances the compound is an apigenin glycoside, for example an apigenin C-glycoside.

The details of one or more embodiments are set forth in the descriptions below. Other features, objects, and advantages will be apparent from the description and from the claims.

BRIEF DESCRIPTION OF THE FIGURES

FIG. 1 depicts pinellic acid concentrations for control bread and for treatment bread where 68.1 mg Schaftoside was added per kg flour prior to bread making.

DETAILED DESCRIPTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes, from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The term "alkyl" as used herein is a branched or unbranched hydrocarbon group such as methyl, ethyl, n-propyl, isopropyl, n-butyl, isobutyl, t-butyl, pentyl, hexyl, heptyl, octyl, nonyl, decyl, dodecyl, and the like. The alkyl group can also be substituted or unsubstituted. Unless stated otherwise, the term "alkyl" contemplates both substituted and unsubstituted alkyl groups. The alkyl group can be substituted with one or more groups including, but not limited to, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol. An alkyl group which contains no double or triple carbon-carbon bonds is designated a saturated alkyl group, whereas an alkyl group having one or more such bonds is designated an unsaturated alkyl group. Unsaturated alkyl groups having a double bond can be designated alkenyl groups, and unsaturated alkyl groups having a triple bond can be designated alkynyl groups. Unless specified to the contrary, the term alkyl embraces both saturated and unsaturated groups.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is replaced with a heteroatom such as, but not limited to, nitrogen, oxygen, sulfur, selenium or phosphorus. The cycloalkyl group and heterocycloalkyl group can be substituted or unsubstituted. Unless stated otherwise, the terms "cycloalkyl" and "heterocycloalkyl" contemplate both substituted and unsubstituted cyloalkyl and heterocycloalkyl groups. The cycloalkyl group and heterocycloalkyl group can be substituted with one or more groups including, but not limited to, alkyl, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol. A cycloalkyl group which contains no double or triple carbon-carbon bonds is designated a saturated cycloalkyl group, whereas an cycloalkyl group having one or more such bonds (yet is still not aromatic) is designated an unsaturated cycloalkyl group. Unless specified to the contrary, the term cycloalkyl embraces both saturated and unsaturated, non-aromatic, ring systems.

The term "aryl" as used herein is an aromatic ring composed of carbon atoms. Examples of aryl groups include, but are not limited to, phenyl and naphthyl, etc. The term "heteroaryl" is an aryl group as defined above where at least one of the carbon atoms of the ring is replaced with a heteroatom such as, but not limited to, nitrogen, oxygen, sulfur, selenium or phosphorus. The aryl group and heteroaryl group can be substituted or unsubstituted. Unless stated otherwise, the terms "aryl" and "heteroaryl" contemplate both substituted and unsubstituted aryl and heteroaryl groups. The aryl group and heteroaryl group can be substituted with one or more groups including, but not limited to, alkyl, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol.

Exemplary heteroaryl and heterocyclyl rings include: benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyL cirrnolinyl, decahydroquinolinyl, 2H,6H-1,5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, and xanthenyl.

The terms "alkoxy," "cycloalkoxy," "heterocycloalkoxy," "cycloalkoxy," "aryloxy," and "heteroaryloxy" have the aforementioned meanings for alkyl, cycloalkyl, heterocycloalkyl, aryl and heteroaryl, further providing said group is connected via an oxygen atom.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. Unless specifically stated, a substituent that is said to be "substituted" is meant that the substituent can be substituted with one or more of the following: alkyl, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol. In a specific example, groups that are said to be substituted are substituted with a protic group, which is a group that can be protonated or deprotonated, depending on the pH.

Acceptable salts are salts that retain the desired flavor modulating activity of the parent compound and do not impart undesirable toxicological effects. Examples of such salts are acid addition salts formed with inorganic acids, for example, hydrochloric, hydrobromic, sulfuric, phosphoric, and nitric acids and the like; salts formed with organic acids such as acetic, oxalic, tartaric, succinic, maleic, fumaric, gluconic, citric, malic, methanesulfonic, p-toluenesulfonic, napthalenesulfonic, and polygalacturonic acids, and the like; salts formed from elemental anions such as chloride, bromide, and iodide; salts formed from metal hydroxides, for example, sodium hydroxide, potassium hydroxide, calcium hydroxide, lithium hydroxide, and magnesium hydroxide; salts formed from metal carbonates, for example, sodium carbonate, potassium carbonate, calcium carbonate, and magnesium carbonate; salts formed from metal bicarbonates, for example, sodium bicarbonate and potassium bicarbonate; salts formed from metal sulfates, for example, sodium sulfate and potassium sulfate; and salts formed from metal nitrates, for example, sodium nitrate and potassium nitrate. Salts may be prepared using procedures well known in the art, for example, by reacting a sufficiently basic compound such as an amine with a suitable acid comprising a physiologically acceptable anion. Alkali metal (for example, sodium, potassium, or lithium) or alkaline earth metal (for example, calcium) salts of carboxylic acids can also be made.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture.

Compounds described herein can contain one or more asymmetric centers and, thus, potentially give rise to diastereomers and optical isomers. Unless stated to the contrary, the present invention includes all such possible diastereomers as well as their racemic mixtures, their substantially pure resolved enantiomers, and all possible geometric isomers.

Disclosed herein a flavor modulating apigenin O-glycosides and C-glycoside compounds. An O-glycoside refers to a carbohydrate bonded to the apigenin via an ethereal bond through the anomeric center, and a C-glycoside refers a carbohydrate directly bonded to the apigenin via a covalent bond at the anomeric, i.e., 1-position. The carbohydrates bonded to the apigenin can be hexosides and/or pentosides, and such carbohydrate can be further glycosylated with additional carbohydrate moieties. In some instances, the apigenin compound can be a compound of Formula (I):

[Formula (I)]

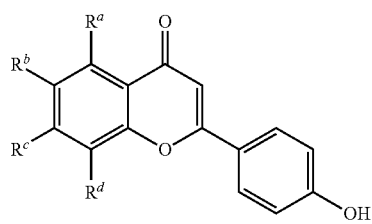

or an acceptable salt thereof, wherein $R^a$, $R^b$, $R^c$, and $R^d$ are independently selected from H, OH, R, or OR;

wherein R is independently in each case can be a hexoside having the formula:

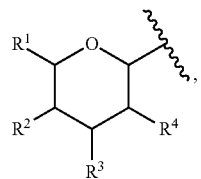

or a pentoside having the formula:

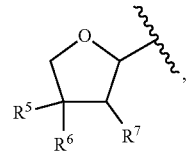

wherein $R^1$ and $R^5$ are independently selected from H, $CH_3$, $CH_2OH$, or $CH_2OR^e$;

$R^2$, $R^3$, $R^4$, $R^6$, and $R^7$ are independently selected from H, OH, or $OR^e$;

$R^e$ can be a hexoside having the formula:

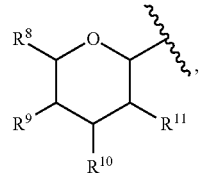

or a pentoside having the formula:

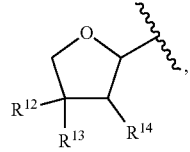

wherein $R^8$ and $R^{12}$ are selected from H, $CH_3$ and $CH_2OH$; and $R^9$, $R^{10}$, $R^{11}$, $R^{13}$, and $R^{14}$ are independently selected from H and OH.

In certain embodiments, it is preferred that at least one of $R^a$, $R^b$, $R^c$, and $R^d$ is R or OR, preferably a C-glycoside (i.e., R). In some embodiments, at least one R group is a hexoside. In yet further embodiments, $R^a$ and $R^c$ are each OH, and $R^b$ and $R^d$ are each R. In certain embodiments, the compound of Formula (I) can be a schaftoside derivative, i.e., $R^a$ and $R^c$ are each OH;

$R^b$ is a hexoside having the formula:

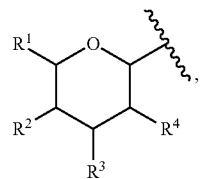

$R^d$ is a hexoside having the formula:

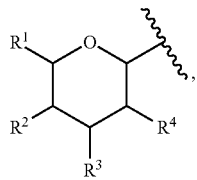

and in each instance, $R^1$, $R^2$, $R^3$, and $R^4$ are independently selected from the definitions given above.

In further embodiments, $R^b$ is a hexoside having the formula:

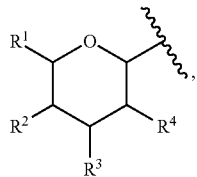

wherein $R^1$ is $CH_2OH$ and each of $R^2$, $R^3$, and $R^4$ are OH; and
$R^d$ is a hexoside having the formula:

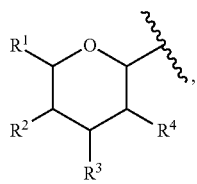

wherein $R^1$ is H and each of $R^2$, $R^3$, and $R^4$ are OH. Although the stereochemistries of the pyranose rings are not particularly limited, in some embodiments $R^b$ is a hexoside having the formula:

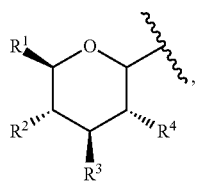

wherein $R^1$, $R^2$, $R^3$ and $R^4$ are as defined above. In yet further embodiments, $R^d$ is a hexoside having the formula:

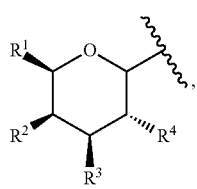

wherein $R^1$, $R^2$, $R^3$ and $R^4$ are as defined above.

In other embodiments, $R^b$ and $R^d$ are each hydrogen, $R^a$ is either hydrogen or OH, and $R^c$ is a hexoside having the formula:

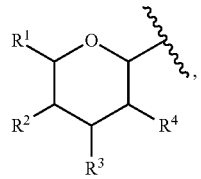

wherein $R^1$ is $CH_2OH$, $R^2$ and $R^3$ are each OH, and R is OH or $OR^e$, wherein $R^e$ is a pentoside having the formula:

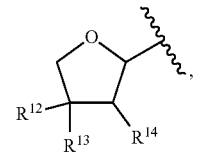

wherein $R^{12}$ is $CH_2OH$, and $R^{13}$ and $R^{14}$ are each OH.

In yet further embodiments, $R^d$ is hydrogen, $R^a$ and $R^c$ are independently selected from hydrogen or OH, and $R^c$ is a hexoside having the formula:

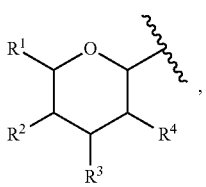

wherein $R^1$ is $CH_2OH$, $R^2$ and $R^3$ are each OH, and $R^4$ is OH or $OR^e$, wherein $R^e$ is a pentoside having the formula:

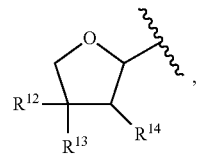

wherein $R^{12}$ is $CH_2OH$, and $R^{13}$ and $R^{14}$ are each OH.

In yet further embodiments, $R^a$ is hydrogen, $R^b$ and $R^d$ are independently selected from hydrogen or OH, and $R^c$ is a hexoside having the formula:

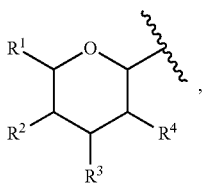

wherein $R^1$ is $CH_2OH$, $R^2$ and $R^3$ are each OH, and $R^4$ is OH or $OR^e$, wherein $R^e$ is a pentoside having the formula:

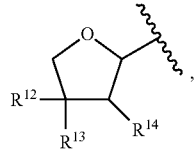

wherein $R^{12}$ is $CH_2OH$, and $R^{13}$ and $R^{14}$ are each OH.

In other embodiments, $R^a$ is OH, $R^b$ and $R^d$ are independently selected from hydrogen or OH, and $R^c$ is a hexoside having the formula:

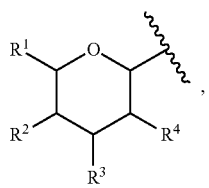

wherein $R^1$ is $CH_2OH$, $R^2$ and $R^3$ are each OH, and $R^4$ is OH or $OR^e$, wherein $R^e$ is a hexoside having the formula:

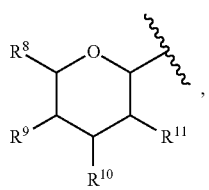

wherein $R^8$ is $CH_3$, and $R^9$, $R^{13}$, and $R^{14}$ are each OH.

In certain embodiments, the flavor modulating compound is a compound having the formula:

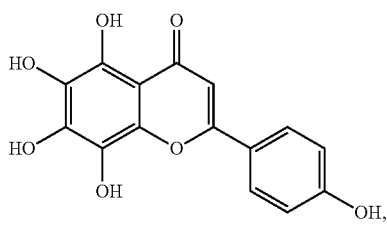

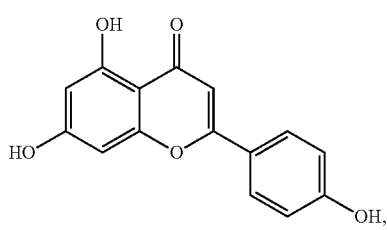

-continued

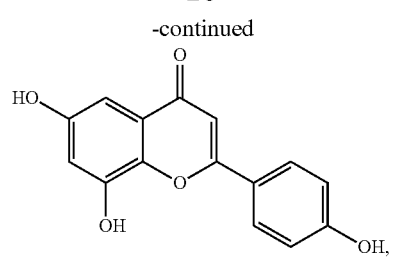

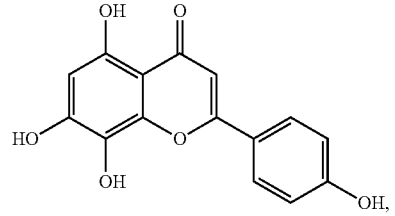

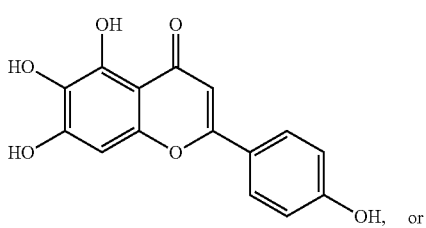

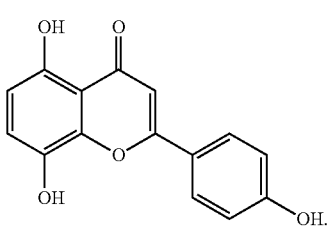

In some instances, the flavor modulating compound has the formula:

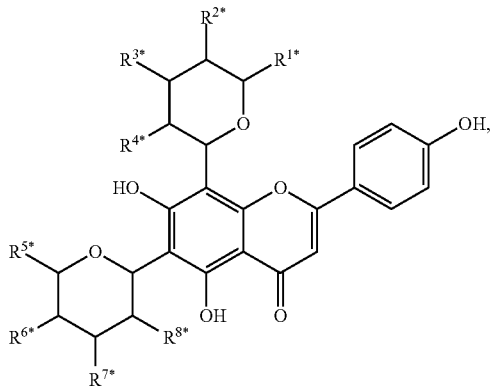

wherein $R^{1*}$, $R^{2*}$, $R^{3*}$, $R^{4*}$, $R^{5*}$, $R^{6*}$, $R^{7*}$, and $R^{8*}$ are independently selected from H, $(CH_2)_nOH$, $OC(O)C_{1-8}$alkyl, $NHC(O)CH_3$, $CO_2H$, $NH_2$, O—$C_{1-8}$alkyl, wherein n is selected from 0 or 1.

In certain embodiments, $R^{1*}$ is $CH_2OH$ and $R^{5*}$ is H. In further embodiments, each of $R^{2*}$, $R^{3*}$, $R^{4*}$, $R^{6*}$, $R^{7*}$, and $R^{8*}$ are OH.

In some instances, the flavor modulating compound has the formula:

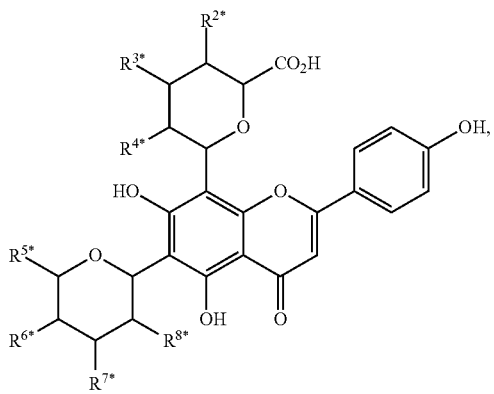

wherein $R^{2*}$, $R^{3*}$, $R^{4*}$, $R^{5*}$, $R^{6*}$, $R^{7*}$, and $R^{8*}$ are as defined above. In some embodiments, $R^{5*}$ is H and, each of $R^{2*}$, $R^{3*}$, $R^{4*}$, $R^{6*}$, $R^{7*}$, and $R^{8*}$ are OH.

In some instances, the flavor modulating compound has the formula:

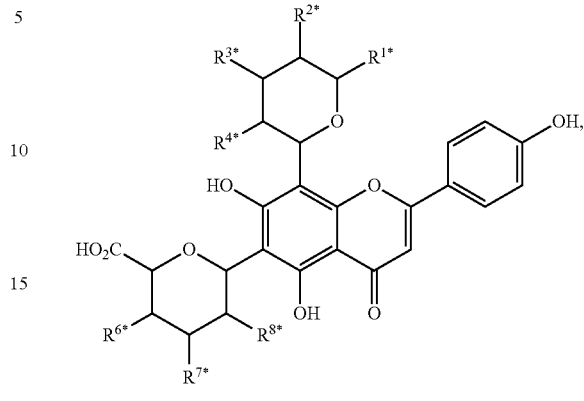

wherein $R^{1*}$, $R^{2*}$, $R^{3*}$, $R^{4*}$, $R^{6*}$, $R^{7*}$, and $R^{8*}$ are as defined above. In some embodiments, $R^{1*}$ is $CH_2OH$ and each of $R^{2*}$, $R^{3*}$, $R^{4*}$, $R^{6*}$, $R^{7*}$, and $R^{8*}$ are OH.

In some instances, the flavor modulating compound has the formula:

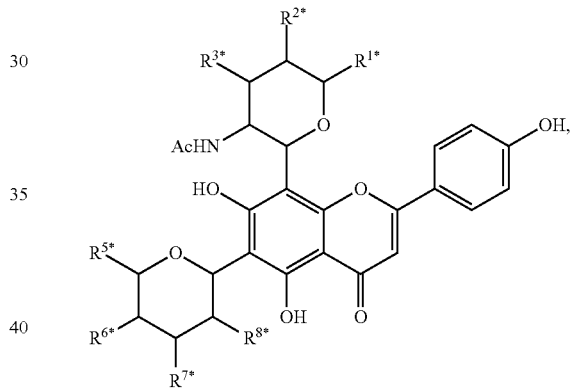

wherein $R^{1*}$, $R^{2*}$, $R^{3*}R^{1*}$, $R^{4*}$, $R^{6*}$, $R^{7*}$, and $R^{8*}$ are as defined above. In some embodiments, $R^{1*}$ is $CH_2OH$ $R^*$ is H, and each of $R^{2*}$, $R^{3*}$, $R^{5*}$, $R^{6*}$, $R^{7*}$, and $R^{8*}$ are OH In some instances, the flavor modulating compound has the formula:

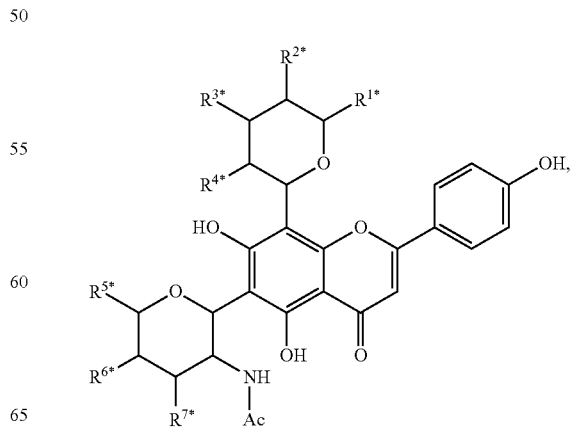

wherein $R^{1*}$, $R^{2*}$, $R^{3*}$, $R^{4*}$, $R^{5*}$, $R^{6*}$, and $R^{7*}$ are as defined above. In some embodiments, $R^{1*}$ is $CH_2OH$, $R^{5*}$ is H, and each of $R^{2*}$, $R^{3*}$, $R^{4*}$, $R^{5*}$, $R^{6*}$, and $R^{7*}$ are OH.

In some instances, the flavor modulating compound can have the formula:

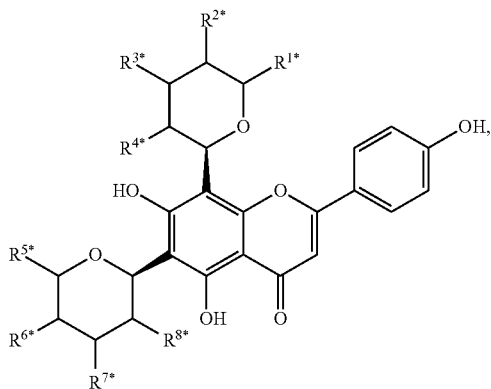

wherein $R^{1*}$, $R^{2*}$, $R^{3*}$, $R^{4*}$, $R^{5*}$, $R^{6*}$, $R^{7*}$, and $R^{8*}$ are as defined above.

In some instances, the flavor modulating compound can have the formula:

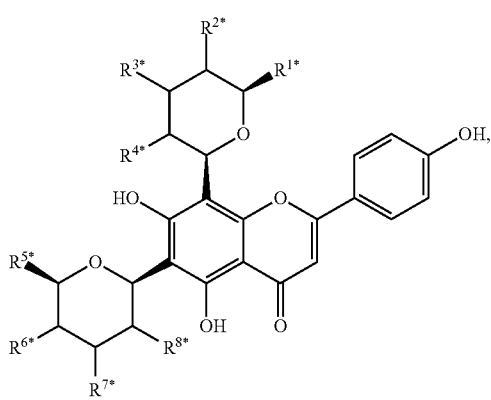

wherein $R^{1*}$, $R^{2*}$, $R^{3*}$, $R^{4*}$, $R^{5*}$, $R^{6*}$, $R^{7*}$, and $R^{8*}$ are as defined above.

In some instances, the flavor modulating compound can have the formula:

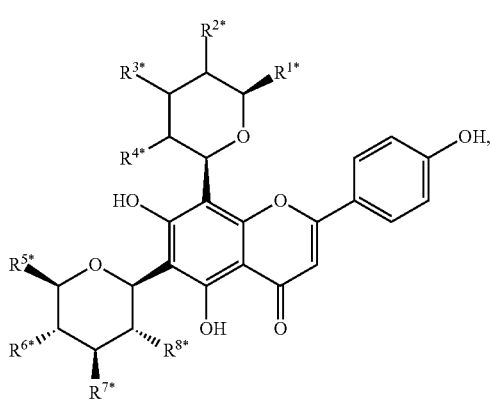

wherein $R^{1*}$, $R^{2*}$, $R^{3*}$, $R^{4*}$, $R^{5*}$, $R^{6*}$, $R^{7*}$, and $R^{8*}$ are as defined above.

In some instances, the flavor modulating compound can have the formula:

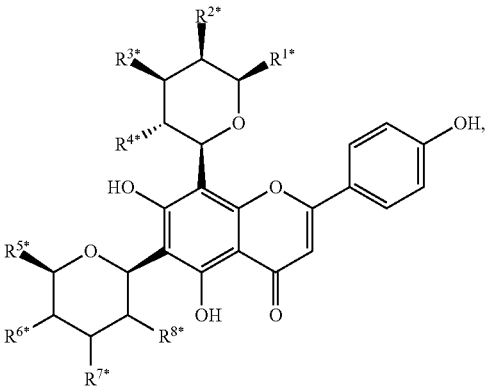

wherein $R^{1*}$, $R^{2*}$, $R^{3*}$, $R^{4*}$, $R^{5*}$, $R^{6*}$, $R^{7*}$, and $R^{8*}$ are as defined above.

In some instances, the flavor modulating compound can have the formula:

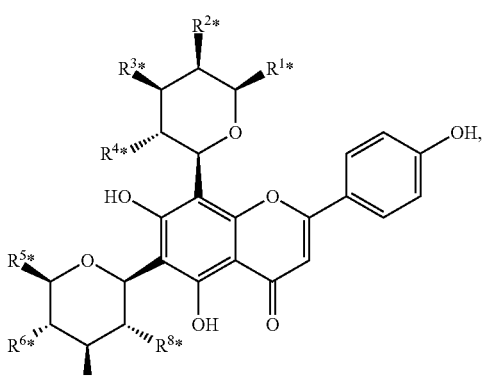

wherein $R^{1*}$, $R^{2*}$, $R^{3*}$, $R^{4*}$, $R^{5*}$, $R^{6*}$, $R^{7*}$, and $R^{8*}$ are as defined above.

In some instances the flavor modulating compound is schaftoside, having the formula:

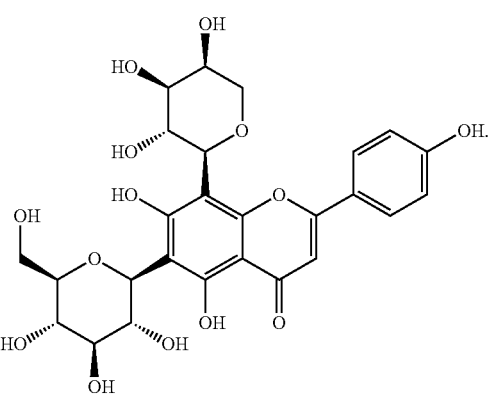 [SMILES: O=c1cc(-c2ccc(O)cc2)oc2c([C@@H]3OC[C@H](O)[C@H](O)[C@H]3O)c(O)c([C@@H]3O[C@H](CO)[C@@H](O)[C@H](O)[C@H]3O)c(O)c12]

The flavor modulating compounds may be added to foods and beverages in concentrations effective to block the bitter and/or sour tastes of the compounds contained therein. The compounds can augment or improve flavors as well as somatosensory effects (e.g., warming cooling sensations) in foods and beverages. The flavor modulating compounds can improve and/or augment the aromas associated with a particular food or beverage. In preferred embodiments, the flavor modulating compounds can be added to a food product such as a grain product. A preferred grain product is flour or dough. In certain embodiments, the food product is beer, wine, distilled spirit or precursor thereof (e.g., mash, grist, grain bill, wort, etc). In yet further embodiments, the food product is a cereal (i.e. oats, barley, rye, rice), tubers (e.g., potatoes, etc.), vegetables (e.g., arugula, kale, broccoli, cabbage, radishes, brussels sprouts), legumes (e.g., peas, soy, etc.) and nuts (e.g., hazelnuts), among others. In other embodiments, the food product is mechanically deboned meat and meat products can also generate pinellic acid.

The compounds may be added to food products as a pure compound (or mixture of compounds), or they may be added as part of an extract or crude mixture having a sufficient content of flavor modulating compound. For example, wheat and other grain products may be subjected to series of extractive protocols to provide an enriched composition of flavor modulating compounds.

For instance, the disclosed compounds may be added in an amount of at least 0.1 mg/kg, at least 0.5 mg/kg, at least embodiments, the composition may be buffered at an acidic pH, for instance similar to found in citrus juice, vinegar, or yogurt. In some embodiment, the composition may be buffered at a pH between 2 and 8, between 2 and 7, between 2 and 6, between 2 and 5, between 2 and 4, between 3 and 8, between 3 and 7, between 3 and 6, between 3 and 5, between 3 and 4, between 4 and 8, between 4 and 7, between 4 and 6, between 4 and 5, between 5 and 8, between 5 and 7, or between 5 and 6.

The compounds may be provided in the composition at a concentration between about 0.1-100 mM, between about 0.5-100 mM, between about 1-100 mM, between about 5-100 mM, between about 10-100 mM, between about 25-100 mM, between about 50-100 mM, between about 0.1-50 mM, between about 0.1-25 mM, between about 0.1-10 mM, between about 0.1-5 mM, or between about 0.1-1 mM. When the aqueous composition contains more than one flavor modulating compound, the concentration refers to the total concentration of all the compounds.

It has been discovered that the bitter flavors found in whole grain foods are associated with the occurrence of pinellic acid. The dominant route for the formation of pinellic acid is through an enzymatic oxidation pathway in which the initial substrate, linoleic acid is sequentially converted to its trihydroxylated form, pinellic acid (Scheme 1).

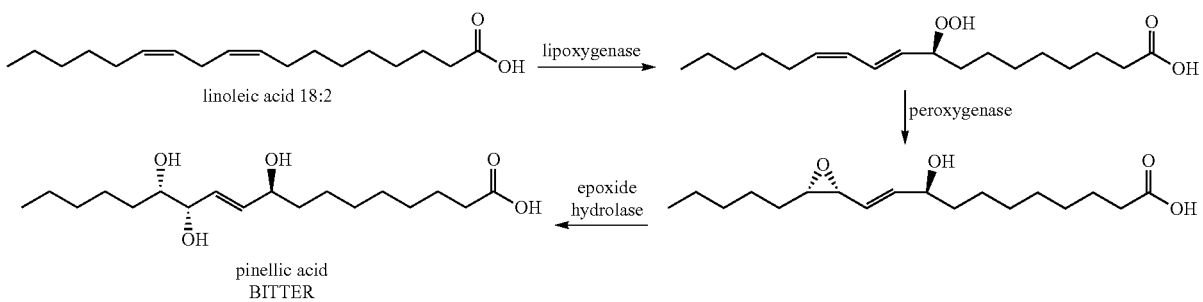

1 mg/kg, at least 2.5 mg/kg, at least 5 mg/kg, at least 10 mg/kg, at least 20 mg/kg, at least 30 mg/kg, at least 40 mg/kg, at least 50 mg/kg, at least 60 mg/kg, at least 70 mg/kg, at least 80 mg/kg, at least 90 mg/kg, at least 100 mg/kg, at least 200 mg/kg, at least 300 mg/kg, at least 400 mg/kg, at least 500 mg/kg, or at least 1,000 mg/kg relative to the total weight of the food product. In some embodiments, the flavor modulating compound can be added in an amount from 0.1-100 mg/kg, from 25-125 mg/kg, from 50-200 mg/kg, from 100-500 mg/kg, or from 250-1,000 mg/kg, relative to the total weight of the food product.

In certain embodiments, the flavor modulating compounds can be delivered to the oral cavity prior to consumption of the bitter product. The compounds can be formulated as a mouthwash, a lozenge, a lollipop, a chewable tablet, and the like. By pre-saturating the bitter and/or sour taste receptors in the tongue with the flavor modulating compounds, otherwise unpalatable substances may be more readily delivered to the oral cavity or consumed.

The compounds disclosed herein may be provided in an aqueous composition to more readily combine them with foods, beverages, and the like. The composition may be buffered, for instance at a pH between 6 and 8, between 6.5 and 8, between 6.5 and 7, between 6.5 and 7.5, between 6.5 and 8, between 7 and 8, or between 7.5 and 8. In other Thus, disclosed herein are compounds capable of reducing pinellic acid levels in food products. In some instances, addition of the compounds disclosed herein to food precursors can reduce pinellic acid levels by at least 10%, at least 15%, at least 20%, at least 25%, at least 30%, at least 40%, at least 50% relative to when the compounds are not added. Exemplary food precursors include flour, dough, and alcoholic beverage precursors as described above.

EXAMPLES

The following examples are for the purpose of illustration of the invention only and are not intended to limit the scope of the present invention in any manner whatsoever.

For the dough analysis 15 mg of Hard Red Winter ("HRW") Everest flour was weighed into 2 Eppendorf tubes containing one 14 inch stainless steel balls, followed by the addition of 12 µL of water (4:5 water/flour ratio) to make a control dough sample. The treatment dough sample was similarly prepared to the control sample with the exception that 946.5 ng of Schaftoside in 12 µL of water (4:5 water/flour ratio) was added instead of pure water.

The concentration of pinellic acid was analyzed for both control and treatment dough samples using the following method: The 15 mg of dough (or 27 mg of bread) was extracted with 1 mL 1:1 IPA/H$_2$O (v/v) spiked with prostaglandin-F2α (PGE-f2α) ISTD. Samples were sonicated for 10 min followed by shaking using the GenoGrinder at 1000 rpm for 10 min. Samples were then diluted 1:50 and sample clean-up was carried out using a 96-well Oasis PRiME HLB plate (1 cc, 30 mg sorbent). After sample load (250 μL) and wash (750 μL, 10% acetonitrile (aq.) with 0.1% formic acid) steps, the retentate was eluted with 500 μL 90% acetonitrile (aq.) with 0.1% formic acid. Samples were further diluted to 2 mL using water with 0.1% formic acid. The standard calibration curve was prepared using 6-points ranging from 0.24 ng/mL to 500 ng/mL.

Quantitative analysis was conducted using MRM acquisition. LC/MS/MS analysis was conducted using a Waters ACQUITY H-class UPLC system coupled with a Xevo TQ-S mass spectrometer (Waters Co.). Conditions employed included a capillary voltage of 2.2 kV, sample cone voltage of 50V, ESI, a source temperature of 150° C., and a desolvation temperature of 550° C. Chromatographic separation was performed on an ACQUITY UPLC BEH C18 1.7 μm column (2.1 mm×50 mm) (Waters Co.) kept at 40° C. Nanopure water with 0.1% formic acid (solvent A) and 9:1 acetonitrile/isopropanol with 0.1% formic acid (solvent B) were used for the mobile phase. Flow rate was set to 0.5 mL/min and a solvent gradient program of 25% B (0.0-1.0 min), 25-95% B (1.0-8.0 min), 95% B (8.0-8.5 min), 25% B (8.5-10.0 min) was employed. The MS/MS transitions and collision energy for pinellic acid was ESI$^-$m/z 329→211 and 22 eV, for PGE-f2α was m/z 353→193 (22 eV).

Wheat breads were made using a modified AACC straight-dough bread-making method (AACC, 1999). The control bread formula (based on 200 g flour) included 200 g of whole wheat flour, 10.6 g of dry yeast, 12 g of sugar, 3 g of salt, 6 g of shortening, and 164 g of water. Ingredients were mixed using a dough mixer (KitchenAid, Benton Harbor, MI) until a sponge dough was formed, approximately 2.5 min. The dough was moved into a 5-¾"×3-¼"×2-¼" loaf pan and fermented for 52 min at 30° C. and 85% relative humidity, then proofed for 25 min and 33 min. Finally, the fermented dough was baked at 215° C. with a beaker filled with 1 L of water for 17 min. Yeast, salt, shortening, and sugar were obtained from the local grocery store (Columbus, OH USA). A treatment bread sample was prepared similarly to the control sample, with the exception that rather than using pure water to make the dough, a water solution with schaftoside was used instead to increase the amount of schaftoside from 88.4 mg/kg to 151.5 mg/kg (an increase of 68.1 mg/kg flour). Sample preparation was as follows; 27 mg of bread was weighed into 2 Eppendorf tubes containing one 4 inch stainless steel balls. The concentration of pinellic acid was analyzed for both control and spiking whole wheat bread samples as described for the dough analysis. The treatment bread sample was significantly lower (pvalue<0.05) in pinellic acid at 228.6 mg/kg compared to the control bread sample at 308.64 mg/kg; thus a 26% reduction in pinellic acid formation resulted from the addition of Schaftoside to the flour prior to bread making. FIG. 1. Similarly, the treatment dough sample reported a significant (pvalue<0.05) 30% reduction in pinellic acid content compared to the control bread sample, which was aligned with the results of whole wheat bread.

Twenty participants were recruited by Flavor Research and Education Center (FREC) at The Ohio State University. The whole wheat bread samples (control and treatment) were cut into 3 cm×2 cm×1 cm (L×W×H) squares of crumb the day before the test and stored at room temperature in sealed 2 oz cups labeled with a 3-digit codes. Each panelist evaluated one pair of samples containing the control sample and the treatment sample. Panelists used nose clips during the evaluation in order to prevent interactions with olfactory responses. Panelists were instructed to place the entire piece of bread crumb in their mouth, chew for 10 seconds, and evaluate the maximum bitter intensity perceived. After evaluating each sample in the pair, panelists were asked to choose the most bitter sample. The serving order of each bread sample was balanced. Water was used as a palate cleanser.

Compusense Cloud Software version 7.2 (Compusense, Guelph, Canada) was used for data collection. Approval of the sensory evaluation protocol was granted by the Ethics Committee, The Ohio State University (IRB #2019B0402). Paired Student t-tests was executed with SPSS Statistics Version 25 (International Business Machines Corp., Armonk, NY). Sensory difference testing indicated the treatment bread sample was significantly less bitter (Pvalue<0.05) than the control bread sample. Thus, the addition of schaftoside to the flour prior to bread making suppressed the generation of pinellic acid that resulted in a reduced perceived bitterness intensity of whole wheat bread.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A method for modulating the flavor of a food product, comprising adding to the food product a compound having the formula:

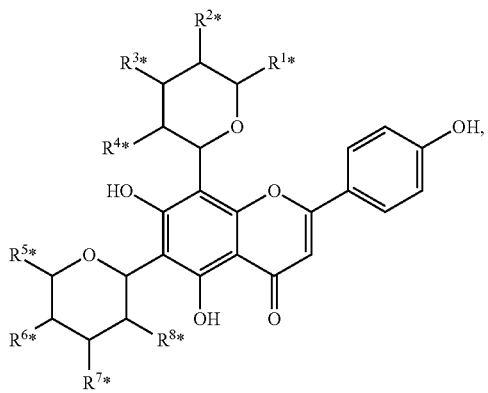

wherein $R^{1*}$, $R^{2*}$, $R^{3*}$, $R^{4*}$, $R^{5*}$, $R^{6*}$, $R^{7*}$, and $R^{8*}$ are independently selected from H, $(CH_2)_n OH$, $OC(O)C_{1-8}$alkyl, $NHC(O)CH_3$, $CO_2H$, $NH_2$, $O-C_{1-8}$alkyl, wherein n is selected from 0 or 1;

with the proviso that $R^{1*}$ is $CO_2H$, $R^{5*}$ is $CO_2H$, $R^{4*}$ is $NHC(O)CH_3$, or $R^{8*}$ is $NHC(O)CH_3$.

2. The method of claim 1, wherein the compound has the formula:

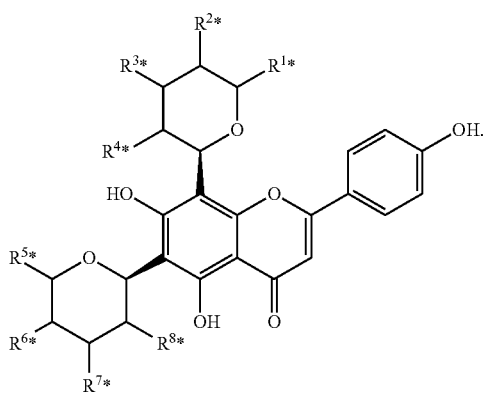

3. The method of claim 1, wherein the compound has the formula:

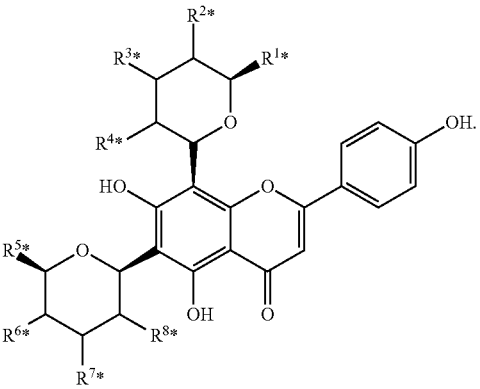

4. The method of claim 1, wherein the compound has the formula:

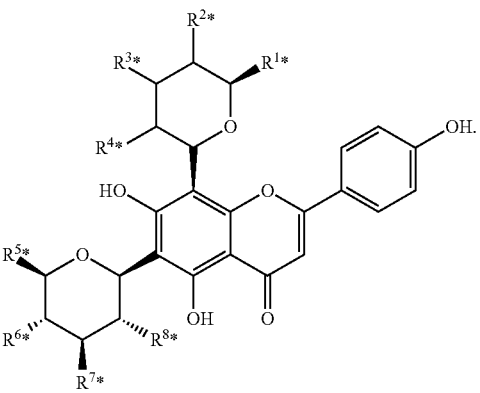

5. The method of claim 1, wherein the compound has the formula:

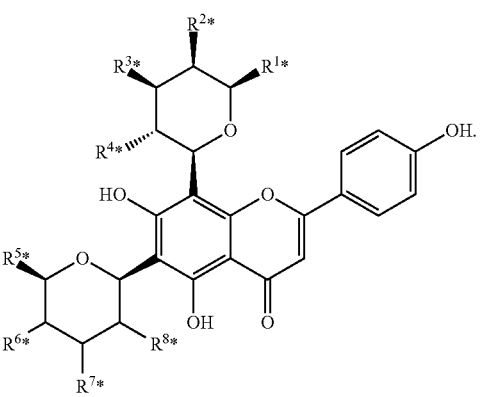

6. The method of claim 1, wherein the compound has the formula:

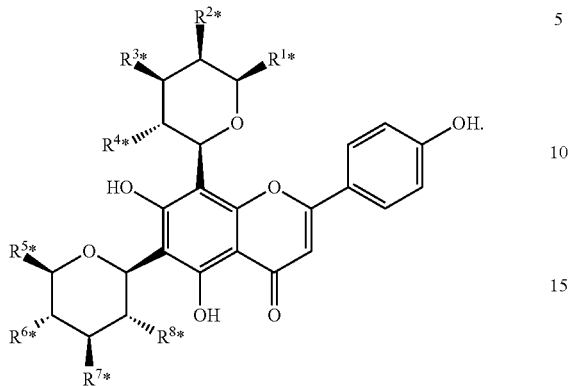

7. The method of claim 1, wherein $R^{1*}$ is $CH_2OH$, $R^{5*}$ is H, each of $R^{2*}$, $R^{3*}$, $R^{4*}$, $R^{6*}$, and $R^{7*}$ are OH, and $R^{8*}$ is $NHC(O)CH_3$.

8. The method of claim 1, wherein $R^{1*}$ is $CO_2H$.

9. The method of claim 1, wherein $R^{5*}$ is $CO_2H$.

10. The method of claim 1, wherein $R^{4*}$ is $NHC(O)CH_3$ or $R^{8*}$ is $NHC(O)CH_3$.

11. The method according to claim 1, wherein the food product is a grain.

* * * * *